United States Patent
Burch et al.

(10) Patent No.: US 7,325,764 B2
(45) Date of Patent: Feb. 5, 2008

(54) METHOD AND APPARATUS FOR WINDING FIELD COILS FOR DYNAMO-ELECTRIC MACHINES

(75) Inventors: Jerry C. Burch, Waynesville, OH (US); Jitendra Ghanekar, Bellbrook, OH (US); James Moran, Kettering, OH (US); Andrew R. Davis, Huber Heights, OH (US)

(73) Assignee: Globe Motors, Inc., Dayton, OH (US)

( * ) Notice: Subject to any disclaimer, the term of this patent is extended or adjusted under 35 U.S.C. 154(b) by 260 days.

(21) Appl. No.: 11/111,033

(22) Filed: Apr. 21, 2005

(65) Prior Publication Data

US 2005/0236509 A1  Oct. 27, 2005

Related U.S. Application Data

(60) Provisional application No. 60/565,324, filed on Apr. 26, 2004.

(51) Int. Cl.
*H02K 15/085* (2006.01)
(52) U.S. Cl. .................. 242/432; 81/9.4; 140/93.6
(58) Field of Classification Search .............. 242/432, 242/434.9, 445.1; 81/9.4, 9.51; 140/93.6, 140/149, 118
See application file for complete search history.

(56) References Cited

U.S. PATENT DOCUMENTS

| 3,570,100 | A  | 3/1971  | Kindell et al. |
| 4,352,305 | A  | 10/1982 | Rodenbeck |
| 4,367,774 | A  | 1/1983  | Arnold et al. |
| 5,361,653 | A  | 11/1994 | Pradin |
| 5,964,429 | A  | 10/1999 | Burch et al. |
| 6,206,319 | B1 | 3/2001  | Burch |
| 6,616,082 | B2 | 9/2003  | Burch |

FOREIGN PATENT DOCUMENTS

| DE | 3213061 A1 | 10/1983 |
| EP | 0364006 A1 | 4/1990  |

*Primary Examiner*—Emmanuel M Marcelo
(74) *Attorney, Agent, or Firm*—Stevens & Showalter LLP

(57) ABSTRACT

A winding machine for winding wire on a stator stack for a dynamo-electric machine including a wire supply, a stripper station for selectively stripping wire at predetermined locations, a wire feed mechanism and winding station including a winding spindle movable in reciprocating and oscillating movement. The feed mechanism is capable of conveying plural wires to the winding spindle including three pairs of wires to respective exit apertures on the winding spindle. The winding station includes twisting assemblies, where a twisting assembly is provided for each pair of wires for twisting the pair of wires together and for gripping and manipulating the wires during a winding operation.

31 Claims, 15 Drawing Sheets

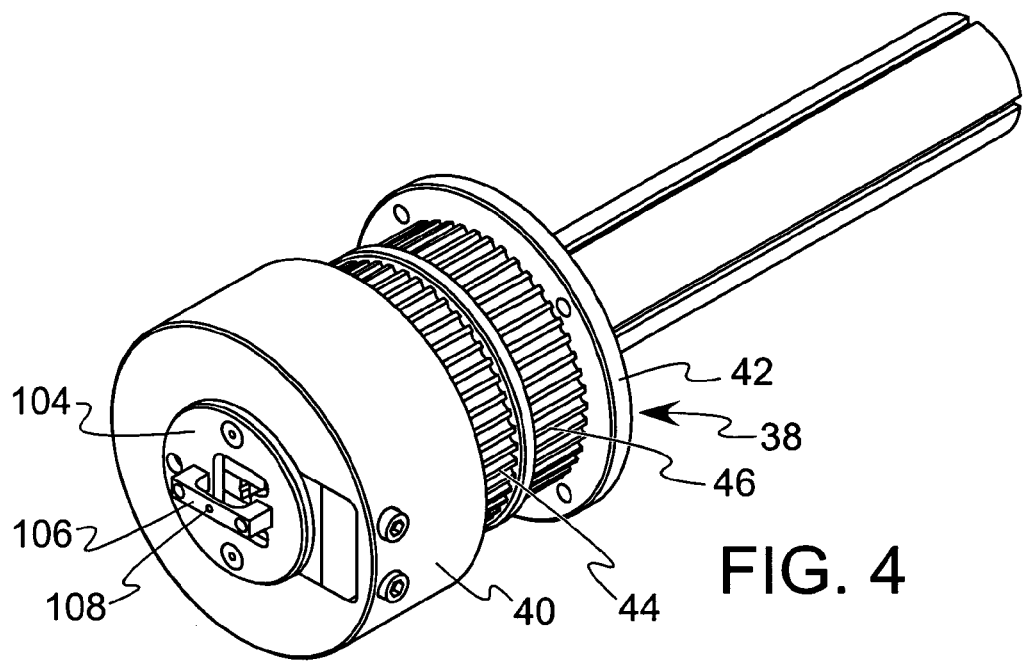
FIG. 4
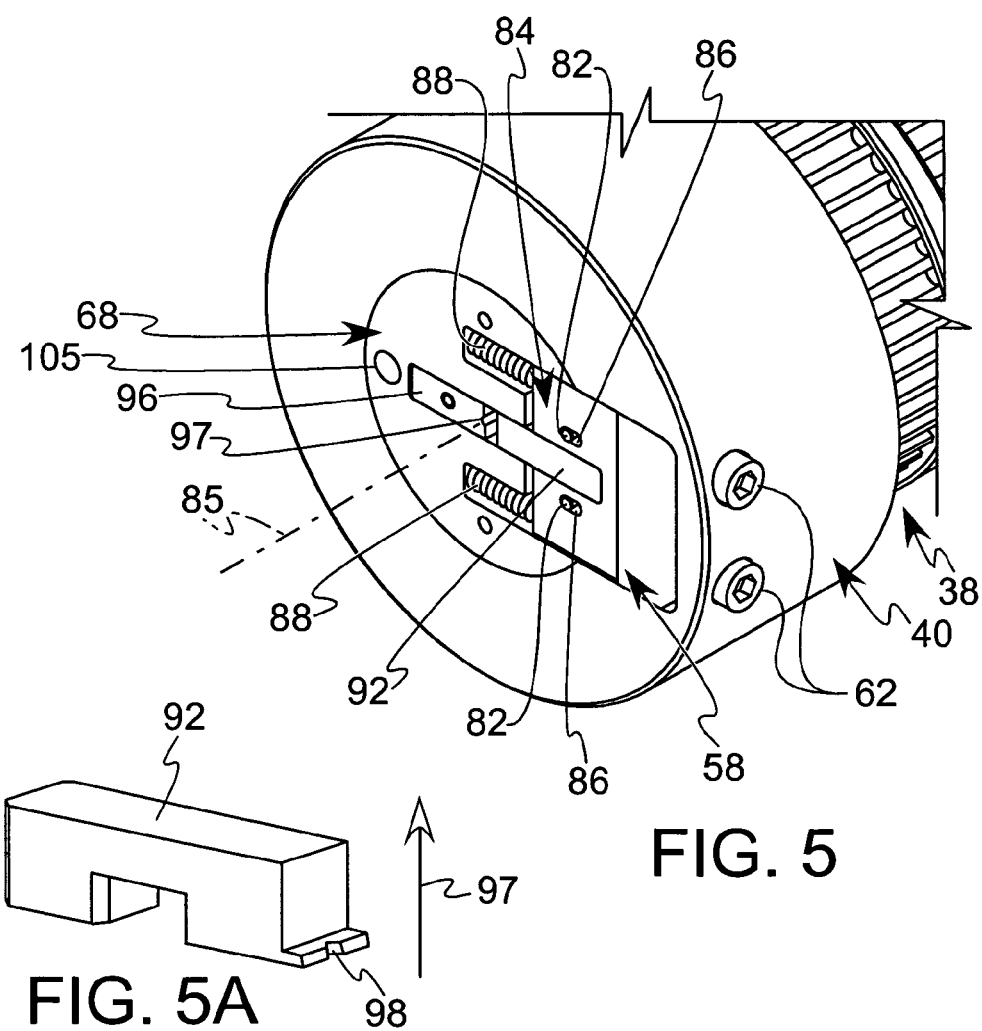
FIG. 5
FIG. 5A

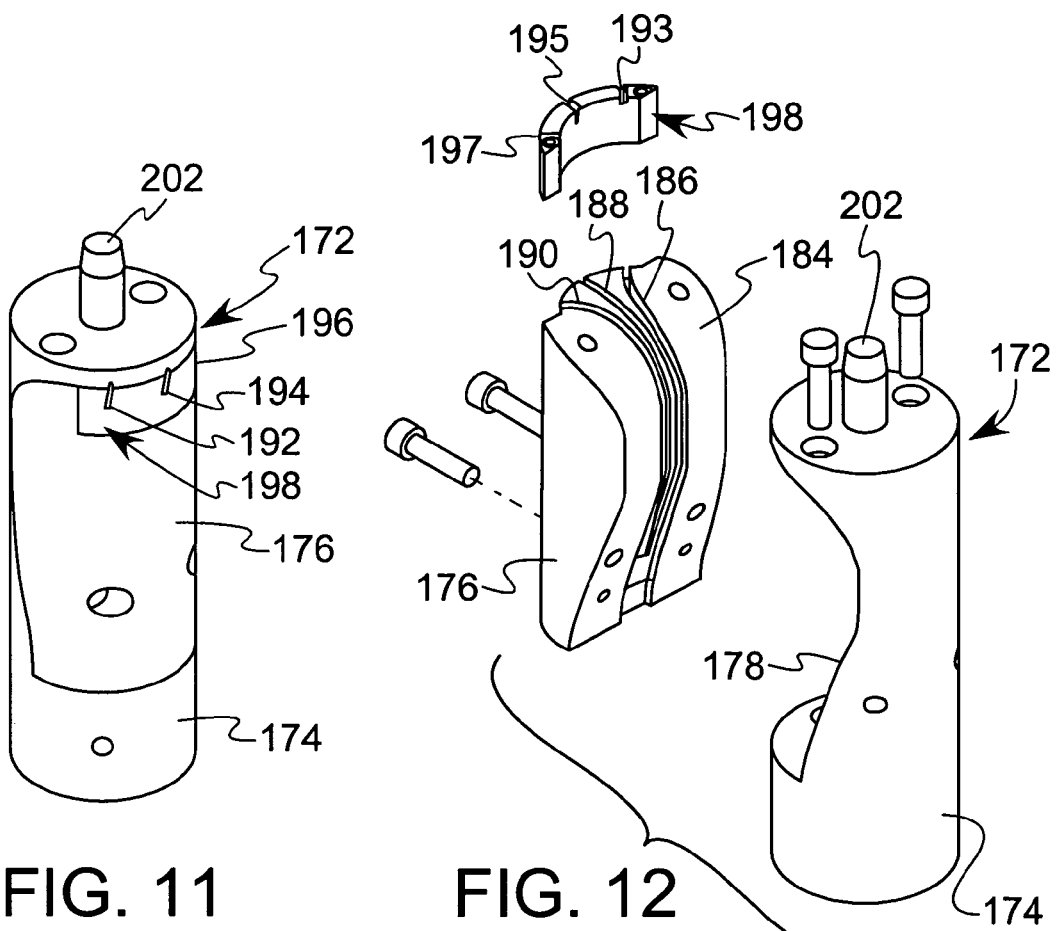
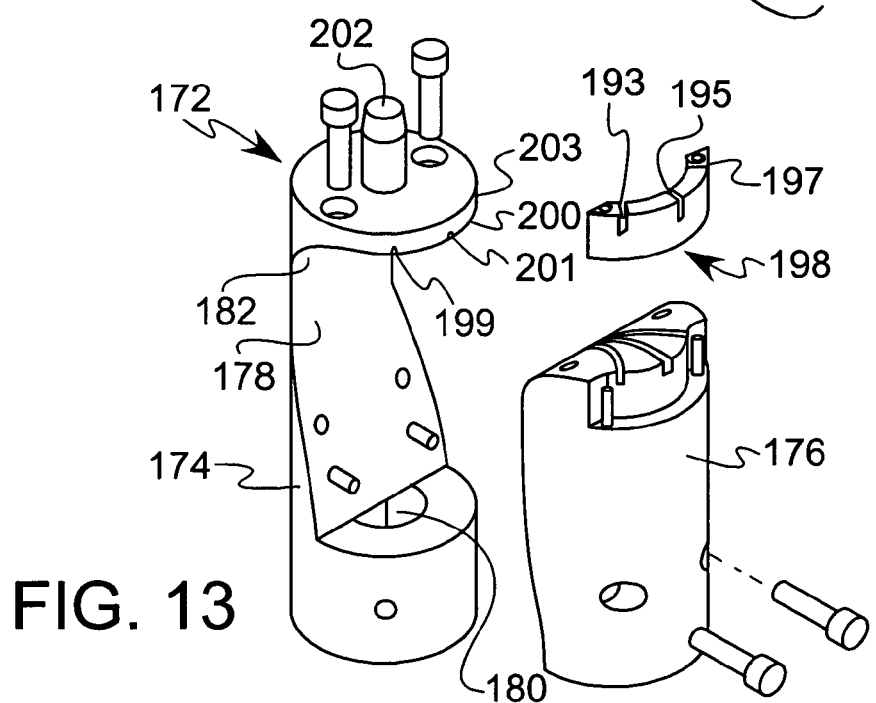
FIG. 11    FIG. 12
FIG. 13

METHOD AND APPARATUS FOR WINDING FIELD COILS FOR DYNAMO-ELECTRIC MACHINES

CROSS-REFERENCE TO RELATED APPLICATIONS

This application claims the benefit of U.S. Provisional Application No. 60/565,324, filed Apr. 26, 2004, which is incorporated herein by reference.

BACKGROUND OF THE INVENTION

1. Field of the Invention

The present invention relates generally to stator winding and, more particularly, to an apparatus and method for forming wound coils on stator stacks for dynamo-electric machines.

2. Description of the Prior Art

Field winding coils for stators are generally placed on the radially inwardly extending teeth of a stator stack by either pre-forming the coils and then pressing the pre-formed coils over the stator stack teeth, or by winding the coils directly onto the stator stack teeth. In the process where the coils are pre-formed, the coils are pushed onto the stator stack by a coil pusher which forcibly pushes the coils over the teeth of the stator stack, and a forming tool, or forming tools, may be provided to shape the wire in the stator stack slots and around the ends of the teeth in order to compactly position the coils on the stator stack. In such a construction, excess wire must be provided for the pre-formed coils in order to accommodate the necessary distortions of the coils as they are pressed over and around the stator stack teeth. Accordingly, such a construction has been found to provide an inefficient amount of wire, as well as result in a larger stator dimension as a result of the excess coil wire extending around the end faces of the teeth for the stator.

In the alternative construction for field winding, wire is fed from a winding spindle or tool directly onto a stator stack wherein the wire is successively wound around the stator stack teeth, and the efficiency of the winding operation is substantially dependent upon the ability to direct the wire to desired locations on the teeth as it is fed from the winding spindle. Such a device for feeding wire onto the stator stack to form the coils directly thereon is disclosed in U.S. Pat. No. 6,616,082.

When the wire being wound into the stator stack slots is of a relatively thick gauge, particular problems arise in the feeding and formation of wire coils on the teeth of the stator stack. In particular, such thick gauge wire does not typically readily conform to the contour of the slot such that the slot fill provided by thick gauge wire may be reduced relative to thinner more flexible gauges of wire.

Further, a winding operation proposed by the present invention in which pairs of wires are wound into the same slot simultaneously introduces additional difficulties not addressed by prior art machines in that the position of each wire in the pairs of wires must be properly coordinated relative to each other in order to ensure sufficient space for all required windings. The difficulty of providing efficient placement of wires is compounded when multiple sets or pairs of wires are placed in the stator stack simultaneously.

SUMMARY OF THE INVENTION

In accordance with one aspect of the invention, a wire stripper for a winding machine for winding wire on a stator stack for a dynamo-electric machine is provided comprising an actuation assembly; a movable blade member located within the actuation assembly; a saddle member located adjacent the blade member and defining a pocket for receiving a wire; the actuation assembly supported for rotational movement about a rotational axis; the actuation assembly defining opposing first and second ends and an opening at each end for passage of wire along the rotational axis from the first end to the second end; the saddle member being stationary, in a radial direction, relative to the rotational axis; and the movable blade member being movable in a radial direction, relative to the rotational axis, to engage a wire located in the pocket of the saddle member.

In accordance with another aspect of the invention, a wire feed for a winding machine for winding wire on a stator stack for a dynamo-electric machine is provided comprising a first plurality of segments connected together to form a first endless segment chain and supported to provide a first elongated run; a second plurality of segments connected together to form a second endless segment chain and supported to provide a second elongated run; the first and second elongated runs located adjacent to each other to define an elongated nip extending in a wire conveyance direction; a wire entry port located adjacent a first end of the nip for feeding wire to the elongated nip; and a wire exit port located adjacent a second end of the nip for receiving wire from the elongated nip.

In accordance with a further aspect of the invention, a winding machine for winding wire on a stator stack for a dynamo-electric machine is provided comprising a stator nest for holding a stator stack; winding tool extending through the stator nest for locating wire in a stator stack held in the stator nest; a wire feeder for driving wire relative to the winding tool; a wire gripper located adjacent the stator nest; the wire gripper including an engagement member moving into engagement with a wire extending between the winding tool and a stator stack in the stator nest.

In accordance with yet another aspect of the invention, a method of winding wire onto a stator stack is provided comprising feeding plural first wire ends from an exit aperture in a winding tool located for passage through a stator stack; gripping the first wire ends with a wire gripper supported for movement adjacent the stator stack; feeding additional wire from the exit aperture in the winding tool and moving the first wire ends away from the winding tool with the wire gripper; rotating the wire gripper to twist the first wire ends together; and moving the winding tool through the stator stack to wind wire coils on teeth of the stator stack.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

FIG. 4 is a perspective view of a stripper head for a wire stripper assembly;

FIG. 5 is an enlarged view of the stripper head shown in FIG. 4 with a stripper head cover and guide bar removed;

FIG. 5A is a perspective view of a movable blade for the stripper head shown in FIG. 4;

FIG. 11 is a perspective view of the winding tool;

FIG. 12 is an exploded perspective view from a rear side of the winding tool;

FIG. 13 is an exploded perspective view from a front side of the winding tool;

DETAILED DESCRIPTION OF THE INVENTION

Figure 1:
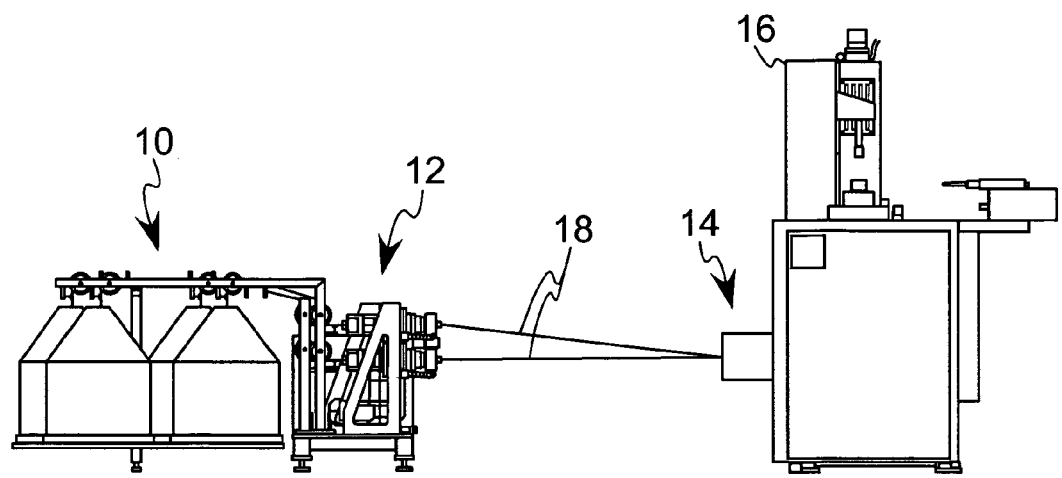
FIG. 1 is an elevation view illustrating a winding machine constructed in accordance with the present invention.
Figure 2:
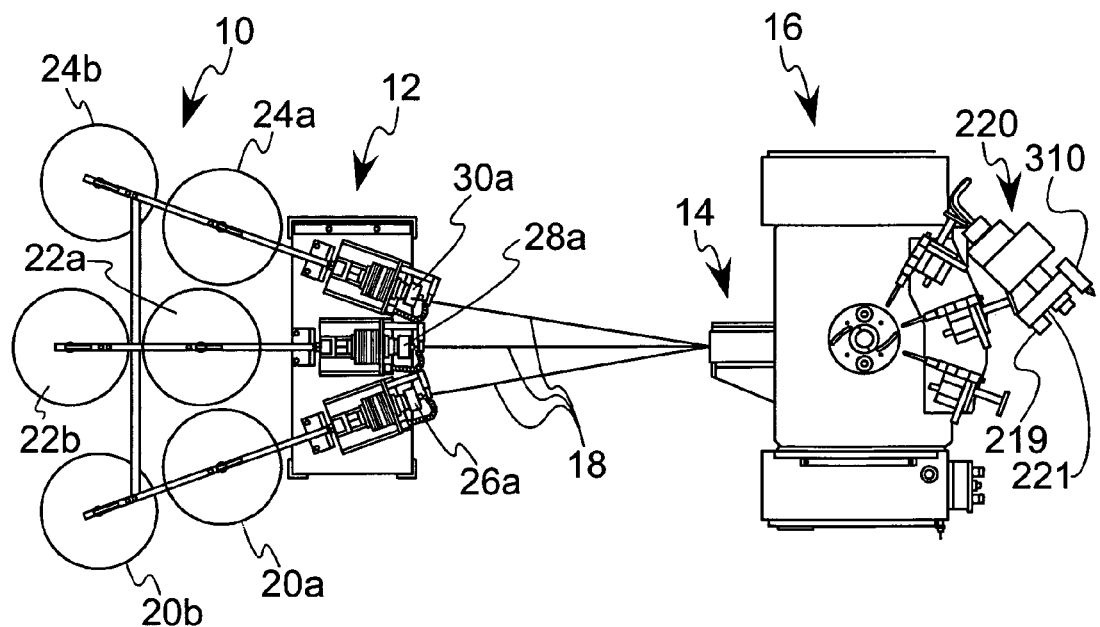
FIG. 2 is a plan view of the winding machine shown in FIG. 1 with the drifting tool assembly and the linear actuator for the wire clamp removed.

Referring to FIGS. 1 and 2, the apparatus of the present invention comprises a wire supply 10, a stripper station 12 a feed mechanism or feeder 14 and a winding station 16. The operation of the apparatus generally includes the feeder 14 exerting a tension on wire 18 from the wire supply 10 to draw wire 18 from the wire supply 10 and push or feed it into the winding station 16. As the wire 18 is drawn through the stripper station 12, insulation is stripped from the wire 18 at predetermined locations along the length of the wire 18. In the winding station 16, the wire 18 is wound onto a stator stack 208 (FIG. 14) in a predetermined pattern around teeth of the stator stack. It should be noted that the wire of the embodiment being described herein is preferably 15 gauge (1.45 mm) wire, although the present apparatus may be used with other thickness or gauge of wire, i.e., the wire may be thicker or thinner.

Figure 3:
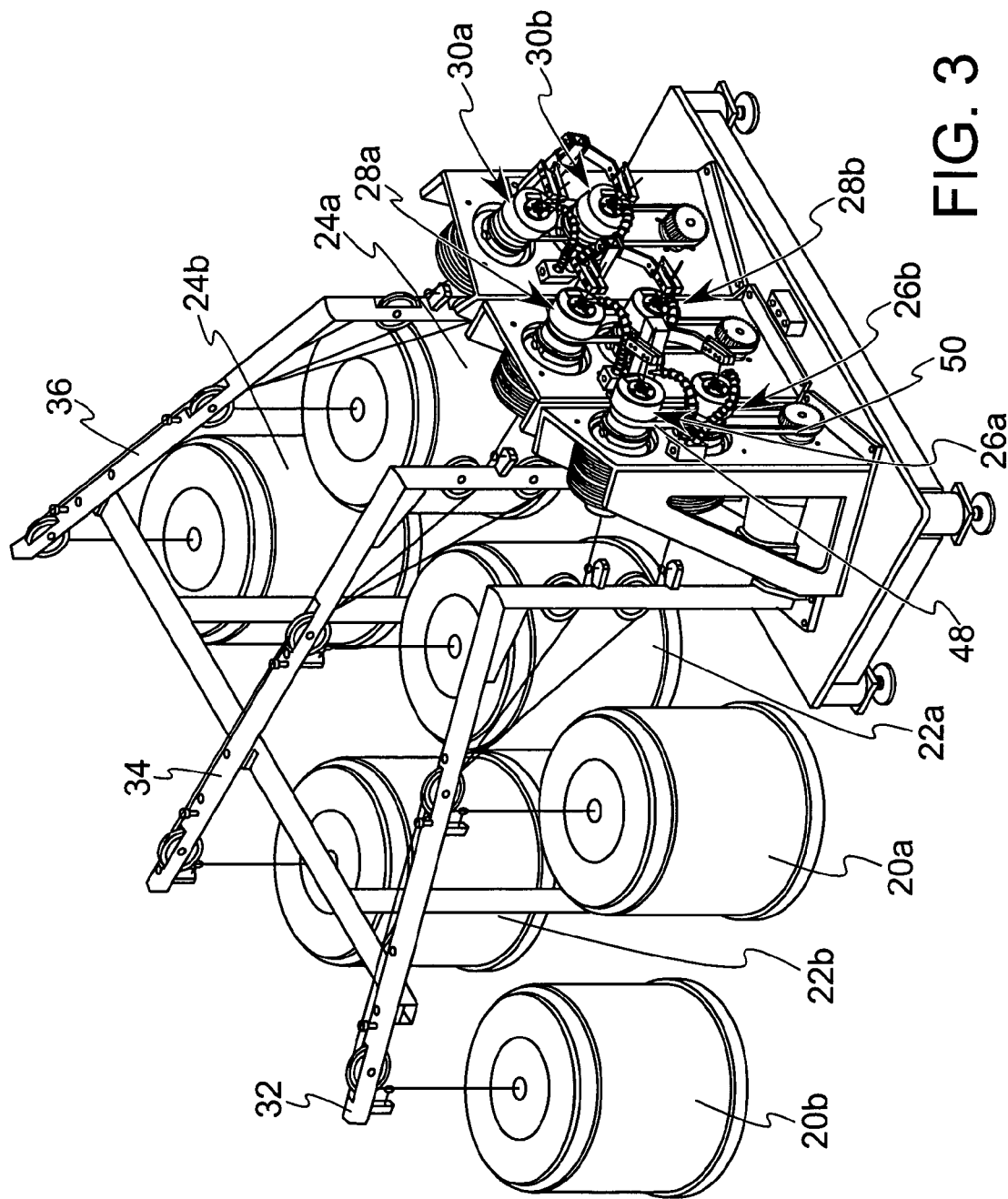
FIG. 3 is a perspective view of a wire supply and wire stripper station of the winding machine in FIG. 1.
Figure 6:
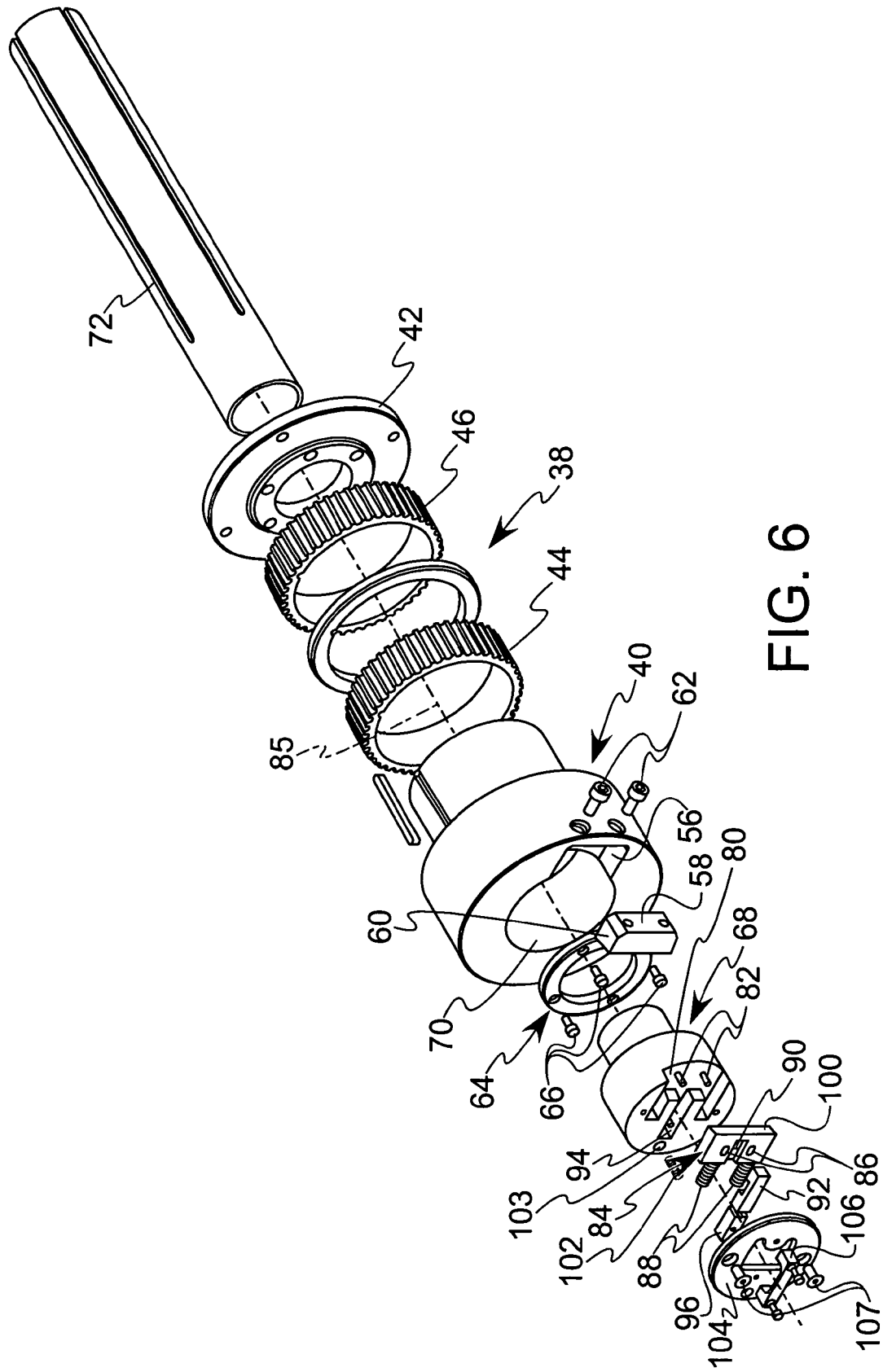
FIG. 6 is an exploded view of the stripper head shown in FIG. 4.

Referring additionally to FIG. 3, six spools 20a, 20b, 22a, 22b, 24a, 24b of wire 18 are provided at the wire supply 10, where the wire 18 from each of the spools 20a, 20b, 22a, 22b, 24a, 24b is guided to respective stripper assemblies 26a, 26b, 28a, 28b, 30a, 30b in the stripper station 12 by wire guide structures 32, 34, 36.

Figure 7:
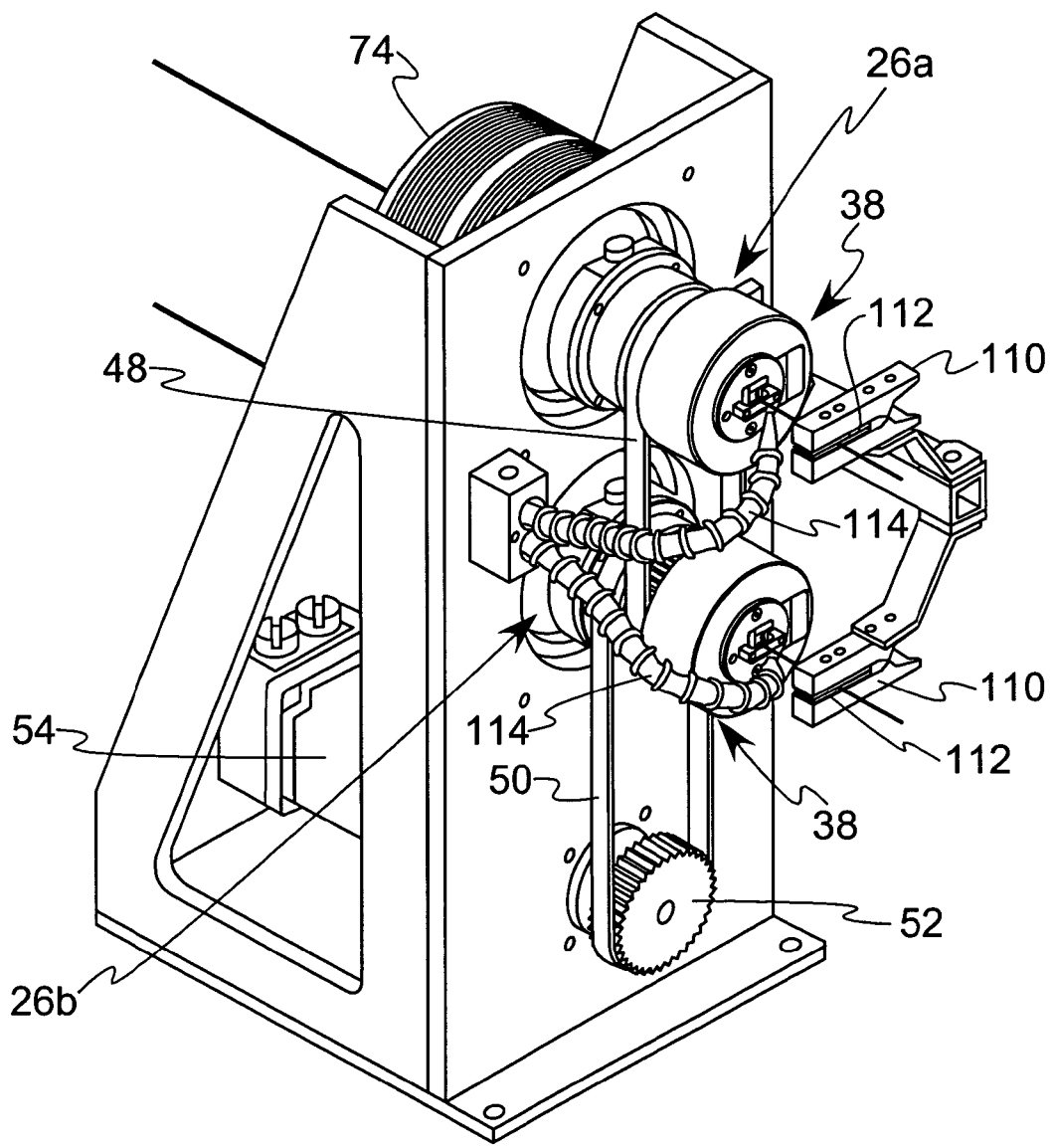
FIG. 7 is a perspective view illustrating a pair of upper and lower stripper assemblies.

Referring to FIGS. 4, 5, 6 and 7, each of the stripper assemblies 26a, 26b, 28a, 28b, 30a, 30b includes a stripper head 38 for stripping predetermined sections of insulation at the predetermined locations along the length of the wire 18, under control of a controller (not shown) for the apparatus. The illustrated stripper head 38 corresponds to one of the lower stripper assemblies, i.e., one of stripper assemblies 26b, 28b, 30b, and comprises a stripper housing 40 supported on a backing plate 42 and including gear tooth sections 44, 46 keyed to the stripper housing for engaging drive belts 48, 50 (FIG. 7). It should be noted that the upper stripper assemblies 26a, 28a, 30a are of the same general construction with the exception that only one gear tooth section 44 is provided. A drive gear 52 of a drive motor 54, i.e., a servo motor, is engaged by the belt 50 for engaging and driving the gear tooth section 46 of the illustrated stripper head 38 in rotating movement. The belt 48 is engaged with the gear tooth section 44 of the illustrated stripper head 38 and further engages and drives the gear tooth section of the associated stripper assembly, i.e., one of assemblies 26a, 28a, 30a, in rotation.

The stripper housing 40 includes a slot 56 (FIG. 6) receiving a stationary cam plate 58 having an angled first camming surface 60. The stationary cam plate 58 is held in position by a pair of fasteners 62. In addition, a stop plate 64 is mounted to the stripper housing 40 and is held in place by fasteners 66.

A stripper spindle 68 is positioned extending into a central aperture 70 of the housing 40 and is attached to an actuation shaft 72 which is actuated in reciprocating movement by an air actuated collet closer 74, such as an air collet closer manufactured by Dunham Tool Company of New Fairfield, Conn. The stripper spindle 68 includes a slot area 80 and a pair of pins 82 extending into the slot area 80. A movable blade holder 84 is positioned in the slot area 80 and includes a pair of elongated slots 86 engaged with the pins 82. The blade holder 84 is movable in a radial direction toward and away from a central axis 85 passing through the stripper housing 40. A pair of compression springs 88 are located to engage and bias the blade holder 84 in a direction away from the central axis 85 of the stripper housing 40. The blade holder 84 includes a slot 90 for receiving and rigidly holding a movable blade 92. The stripper spindle 68 includes a slot 94 for rigidly holding a stationary saddle 96 in facing relationship to the movable blade 92. The movable blade 92 includes a V-notch 98 for engaging the outer surface of wire 18 passing through the stripper head 38 and moving in the direction of the arrow 97, as illustrated in FIG. 5A. The stationary saddle 96 provides a support surface, i.e., arcuate surface 97, adjacent the central axis 85 of the stripper housing 40 defining a pocket for supporting the wire 18 at the rotational axis of the stripper head 38, such that the engagement of the movable blade 92 with the wire 18 in the radial direction may be accurately controlled.

Actuation of the movable blade 92 into and out of engagement with the wire 18 is controlled through controlled axial movement of the actuation shaft 72, where movement causing the stripper spindle 68 to move into the aperture 70 of the housing 40 causes movement of the blade 92 toward the saddle 96 as a second camming surface 100 on the blade holder 84 moves along the angled surface of the first camming surface 60. The movement of the stripper spindle 68 back into the aperture is limited by contact of a set screw 102 with the stop plate 64, where the set screw 102 is threaded into a hole 103 and extends out the back of the stripper spindle 68 for engaging the stop plate 64. The stroke of movement for the stripper spindle 68 may be controlled by adjustment of the set screw 102 to thereby accurately adjust the amount that the blade 92 moves toward the saddle 96 and thereby obtain accurate adjustment of the amount of material removed from the wire 18 during a stripping operation.

A stripper head cover 104 is provided attached to the front of the housing 40 to cover and facilitate retention of the components held in the stripper spindle 68, where the cover 104 is held in place by fasteners 107 engaged with the stripper spindle 108. The cover 104 includes an aperture 105 for permitting access to adjust the set screw 102.

In addition, a guide bar 106 is mounted to the cover 104. The guide bar 106 includes an aperture 108 which receives the wire 18 and maintains alignment of the wire 18 as it passes out of the stripper. In order to remove debris from the wire 18 passing out of the stripper head 38, a wire clamp 110 (FIG. 7) having felt engagement surfaces 112 is provided.

Further, the stripper assemblies 26a, 26b, 28a, 28b, 30a, 30b are each provided with a flexible air conduit 114 which is directed to the exit of the stripper head 38. The air conduits operate to blow air across the exit of the respective stripper heads 38 to facilitate removal of any debris remaining from the stripping operation.

As noted previously, the wire is stripped at predetermined sections along the wire 18. In particular, two stripped sections are provided adjacent to each other and spaced from each other by a short length of unstripped section. The leading stripped section forms the end or final portion of a wound coil on the stator stack and the following stripped section is provided to form the beginning of a next coil to be wound on the stator stack. The stripped sections provide stripped areas of the wound coil ends for electrical connection of the coil wire of the wound stator into a dynamoelectric machine utilizing the stator. In should be understood that the collet closer 74 is operated under control of the system controller (not shown) in order to move the blade 92 into engagement with the wire 18 and to actuate the motor 54 to drive the drive gear 52 in order to rotate the stripper head 38 simultaneously with the wire 18 being drawn through the stripper head 38 to strip the sections of wire 18 at the appropriate locations on the wire 18, and to disengage the blade 92 and deactivate the motor 54 when non-stripped sections of the wire 18 are required to be fed.

Figure 8:
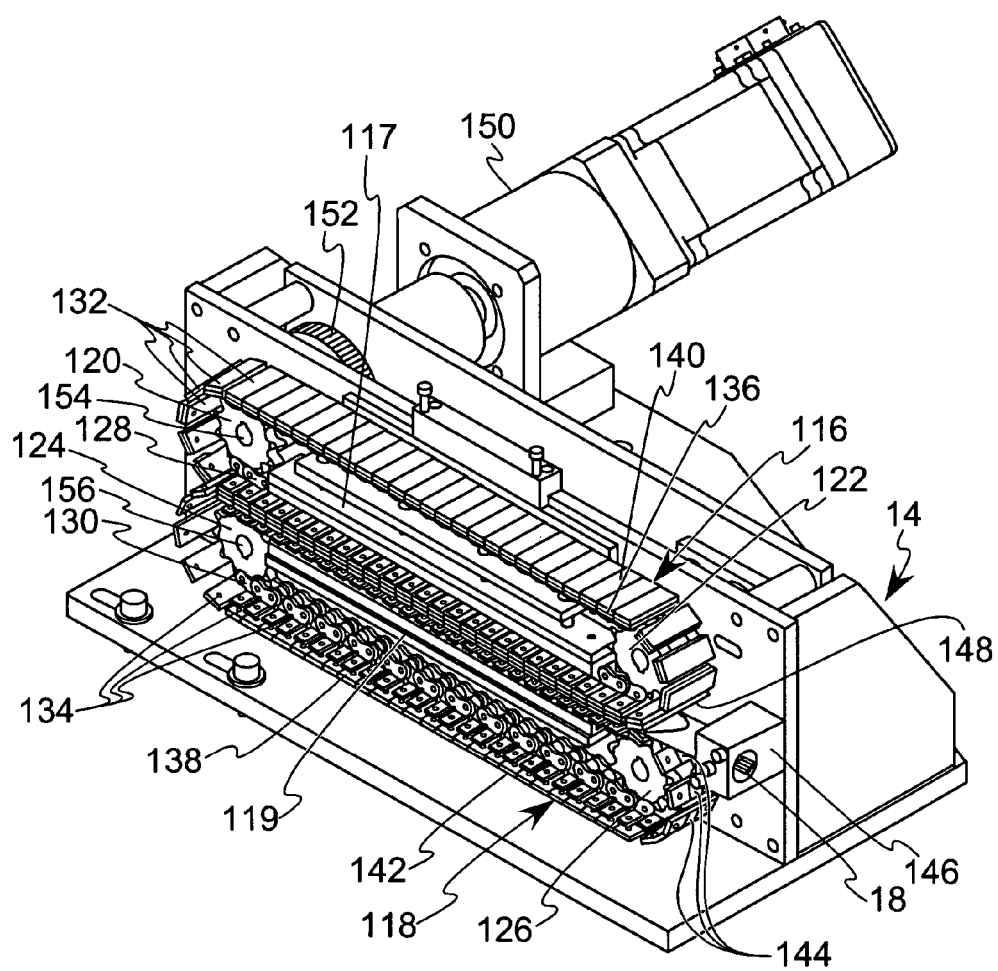
FIG. 8 is a perspective view of a wire feed mechanism for the winding machine in FIG. 1.
Figure 9:
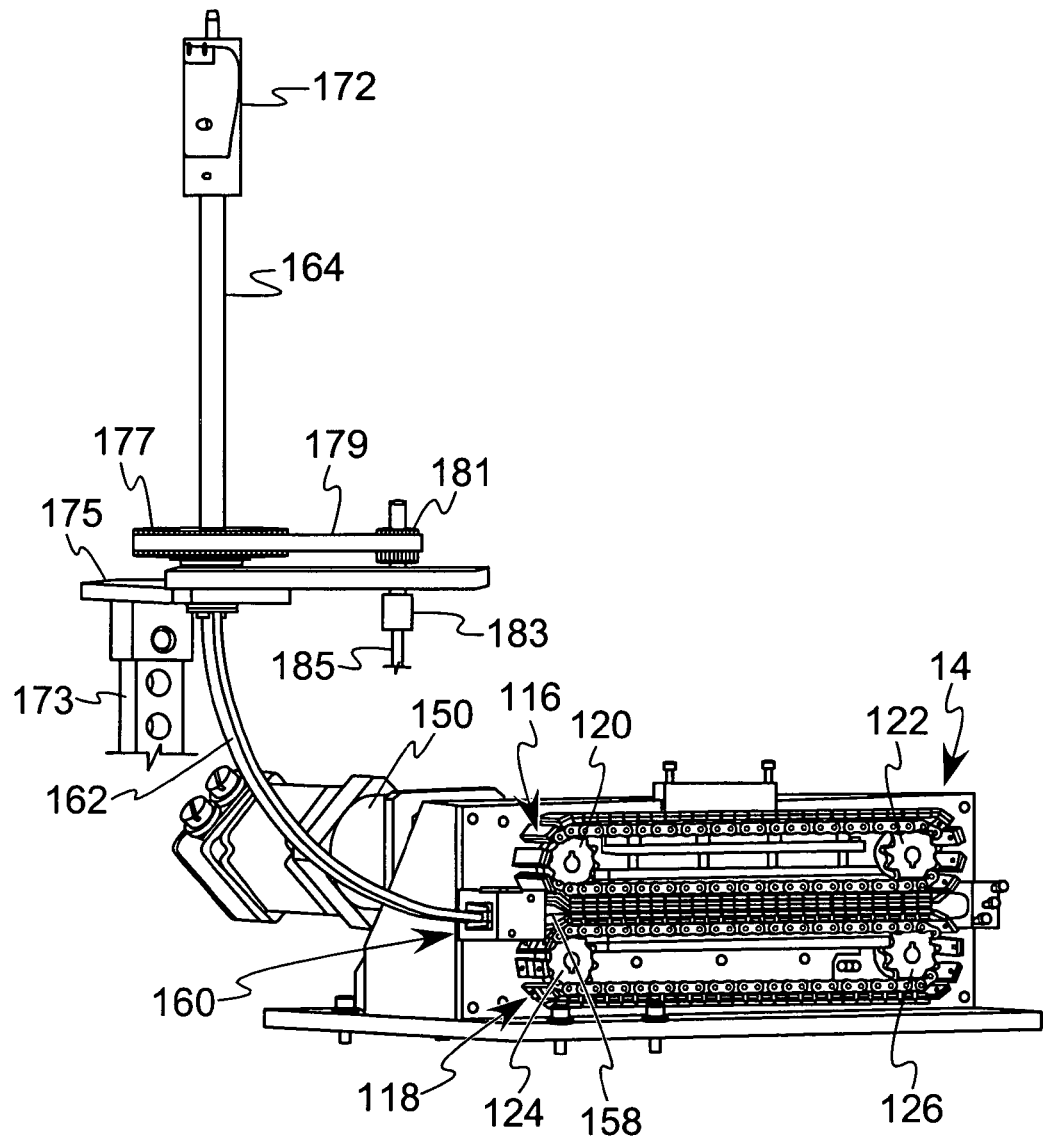
FIG. 9 is a perspective view including the wire feed mechanism, a flexible wire guide tube, and a winding tool.

Referring to FIGS. 8 and 9, wire feed from the wire supply 10 through the stripper station 12 and into the winding station 16 is controlled by the wire feed mechanism 14. The wire feed mechanism 14 is designed to simultaneously feed six wires 18 while maintaining precise positioning of each of the wires 18. The wire feed mechanism 14 includes an upper or first endless segment chain 116 and a lower or second endless segment chain 118. The first endless segment chain 116 is supported by first and second gear members 120, 122 and the second endless segment chain 118 is similarly supported by first and second gear members 124, 126, such that elongated runs of the first and second endless segment chains 116, 118 are in engagement with each other to form a wire drive nip therebetween.

Each of the endless segment chains 116, 118 comprises a respective chain 128, 130 and sets of segments or pads 132, 134 mounted to the chains 128, 130. Each set of pads 132, 134 comprises a metal, such as aluminum, backing plate 136, 138 and a resiliently compliant engagement layer 140, 142 for engaging the wire 18. In the preferred embodiment, the compliant engagement layer 140 of the first set of pads 132 is formed of 80 Shore A durometer hardness polyurethane, and the compliant engagement layer 142 of the second set of pads 134 is formed of a harder material such as 90 Shore A durometer hardness polyurethane. In addition, the compliant engagement layers 142 of the second set of pads 134 are each formed with a wide groove or recessed area 144 for receiving the six wires 18 in side-by-side relationship to maintain a predetermined position of the wires 18 as they pass through the elongated nip. The recessed area 144 is formed with a depth which is approximately one-third the diameter of the wire 18. Engagement pressure in the elongated nip is maintained by upper and lower pressure members 117, 119 engaging the respective endless segment chains 116, 118.

The wires 18 arriving from the stripper station 12 enter an alignment fixture 146 for positioning the wires 18 in side-by-side relationship prior to entering the elongated nip of the feed mechanism 14. The alignment fixture 146 includes an elongated tube portion 148 which has a tapered end so that a minimum length of wire extends between the end of the elongated tube portion 148 and elongated nip between the endless segment chains 116, 118.

The feed mechanism 14 includes a servo motor 150 for driving the endless segment chains 116, 118. The servo motor 150 directly drives the first gear member 120 of the first endless segment chain 116, and a gear 152 on the shaft 154 connected to the first gear member 120 is engaged with a gear (not shown) on the shaft 156 connected to the first gear 124 such that the first gears 120, 124 and their associated endless segment chains 116, 118 are simultaneously driven at the same speed. The servo mechanism 150 is operated under control of the system controller (not shown) to move the wire 18 in both the forward and reverse directions, as required by the particular step being performed in the process of winding a stator.

The wire 18 is fed from the elongated nip of the feed mechanism 14 to an exit tube 158 of a wire exit fixture 160. The exit tube 158 has a tapered end to permit positioning of the tube 158 in close proximity to the nip. An elongated flexible wire guide tube 162 is provided and includes one end connected to the wire exit fixture 160 and an opposite end connected to the bottom of a winding tool shaft 164. The guide tube 162 guides the wire 18 from the feed mechanism 14 to the interior of the winding tool shaft 164.

Figure 10:
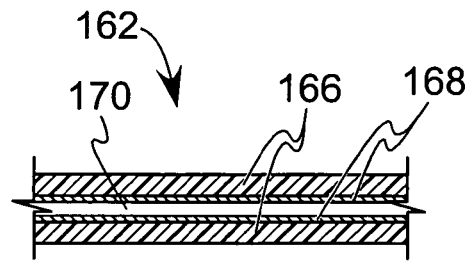
FIG. 10 is a cross-sectional view taken through the wire guide tube.

As may be seen in FIG. 10, the flexible wire guide tube 162 is formed with a generally rectangular outer sleeve 166 defined by an extruded plastic tube. The wider dimensioned interior sides are each lined with spring steel strips 168. The wire 18 is guided through an interior passage 170 of the guide tube 162 in side-by-side relation and the spring steel strips 168 provide a low friction surface for guiding the wire 18. The spring steel strips 168 further provide a resilient rigidity allowing the guide tube 162 to bend along one axis as well as permitting the guide tube 168 to twist.

The structure supporting the winding tool shaft 164, including the actuation structure for actuating the tool shaft 164 and a winding tool 172 located at the top of the tool shaft 164 in movement is disclosed in U.S. Pat. No. 5,964,429. Referring to FIG. 7, the tool shaft 164 and associated winding tool 172 are actuated for reciprocating movement by a drive rod 173 pivotally connected to a slide block platform 175 supporting the tool shaft 164. The drive rod 173 may be driven by an eccentric drive mechanism (not shown) in a known manner. Rotational movement of the tool shaft 164 may be obtained by a spindle shaft gear 177 driven by a belt 179 engaged around an oscillating gear 181. The oscillating gear 181 is coupled to a coupler 183 which is slidably engaged on a splined shaft 185, driven by a servo motor (not shown) to move the shaft 185 in precise oscillating movement. The splined engagement between the coupler 183 and the shaft 185 permits sliding movement of the coupler 183 relative to the shaft 185 while transmitting an oscillating drive movement to the winding tool 172 in a manner described in U.S. Pat. No. 5,964,429. Specifically, the winding tool 172 is moved in generally longitudinal movement as wire is fed through slots of a stator stack, and the winding tool 172 is rotated at the end of each longitudinal stroke to form end turns around the ends of the stator stack as wire is fed from the winding tool, as controlled by the wire feed mechanism 14. The present invention provides an improvement in locating the feed mechanism 14 in spaced relation to the reciprocating components to thereby reduce the weight and provide for increased speed of the moving components in the winding station 16.

Referring to FIGS. 11, 12 and 13, the winding tool 172 includes a tool base 174 and a wire guide insert member 176 attached to a side portion of the tool base 174. The tool base 174 includes an indentation area 178 which angles radially outwardly from a generally central wire entry location 180 at the bottom of the tool base 174 toward one side at an upper area 182, and the upper area 182 is curved in a radial direction back toward the opposite side of the tool 172. The outward angle of the indentation area 178 and the curvature of the upper area 182 are provided to permit the wire 18 to pass centrally out of the tool shaft 164 and follow a sufficiently broad radius of curvature to reduce any bending required of the wire 18 as it passes up through the winding tool 172.

The wire guide insert member 176 includes an engagement surface 184 for engaging with the surface of the indentation area 178 and including grooves 186, 188, 190 defined in the engagement surface 184 for guiding wire 18 to respective exit apertures 192, 194, 196. The exit apertures 192, 194, 196 are vertically elongated apertures which are defined by elongated angled slots 193, 195, 197, an insert sector 198, and by grooves 199, 201, 203 in an upper outer edge 200 of the outwardly curved upper area 182, where the slots 193, 195, 197 are angled at the same angle as a skew angle of the slots defined in the stator stack 208 to be wound. The grooves 186, 188, 190 function in a manner similar to that described for the winding tool grooves in U.S Pat. No. 6,616,082, where the entrance to the grooves 186, 188, 190 of the winding tool 172 are configured to guide the wire 18 into the grooves 186, 188, 190 as the wire is threaded up into the winding tool 172 from the tool shaft 164, such that the winding tool 172 is self threading. However, in the present tool 172, a pair of wires 18 is threaded into each of the grooves 186, 188, 190, where the pairs of wires 18 are oriented vertically within the grooves 186, 188, 190, and the angle of the slots 193, 195, 197 positions the vertically oriented wires at an angle substantially matching the angle of the slots between teeth of the stator stack 208. Further, each pair of wires guided through one of the three grooves 186, 188, 190 is drawn through a corresponding one of the pairs of wire stripper assemblies 26a, 26b; 28a, 28b; 30a, 30b. In accordance with the present invention, the wires 18 exiting each aperture 192, 194, 196 of the winding tool 172 are wound in the stator stack as wire pairs, rather than as single strands of wire.

It should be noted that the insert sector 198 may be replaced with an insert sector having slots oriented a different angle, and thus may accommodate use of the winding tool 172 to wind coils on stator stacks having slots formed at different angles.

As with the winding tool disclosed in U.S. Pat. No. 6,616,082, the top of the winding tool 172 includes an alignment shaft 202. The alignment shaft 202 engages with a cooperating aperture in the bottom of a drifting tool 204 (FIG. 14) to maintain alignment between the winding tool 172 and the drifting tool 204 during a winding operation.

Figure 14:
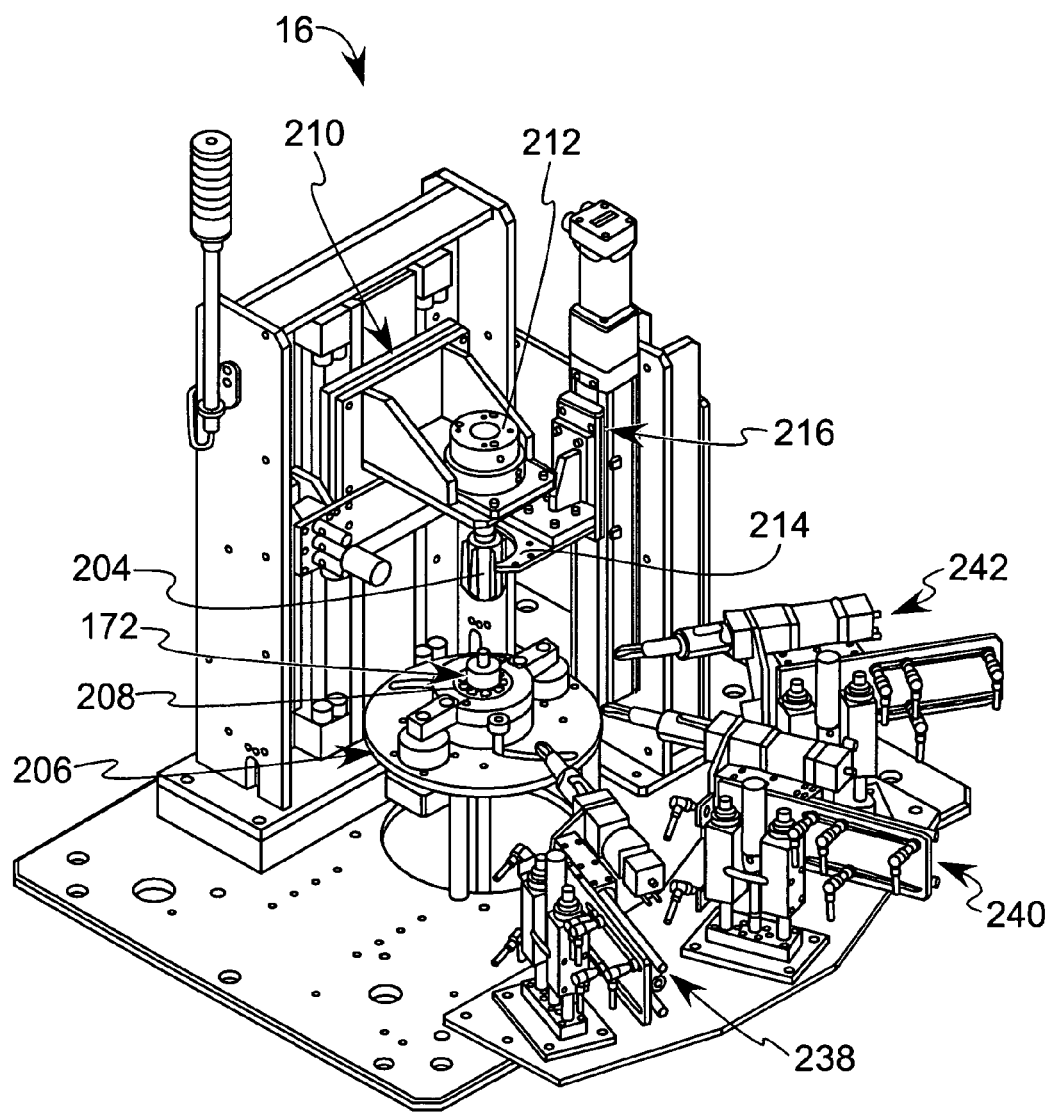
FIG. 14 is a perspective view of a winding station for the winding machine in FIG. 1.

Referring to FIG. 14, the components of the winding station 16 for performing the coil winding operation are substantially the same as those described in U.S. Pat. No. 6,616,082, and in U.S. Pat. No. 6,206,319, which discloses a lower wire clamp as used in the apparatus disclosed in U.S. Pat. No. 6,616,082. Generally, the winding station 16 includes a stator nest 206 for holding a stator stack 208 to be wound, and through which the winding tool 172 passes in reciprocating and rotating movement. The drifting tool 204 is supported for reciprocating movement with the winding tool 172 by drifting tool assembly 210 and is actuated in rotating movement by a servo motor driven actuator 212. In addition, an upper wire clamp 214 is supported for vertical reciprocating movement by a linear actuator 216.

Figure 15:
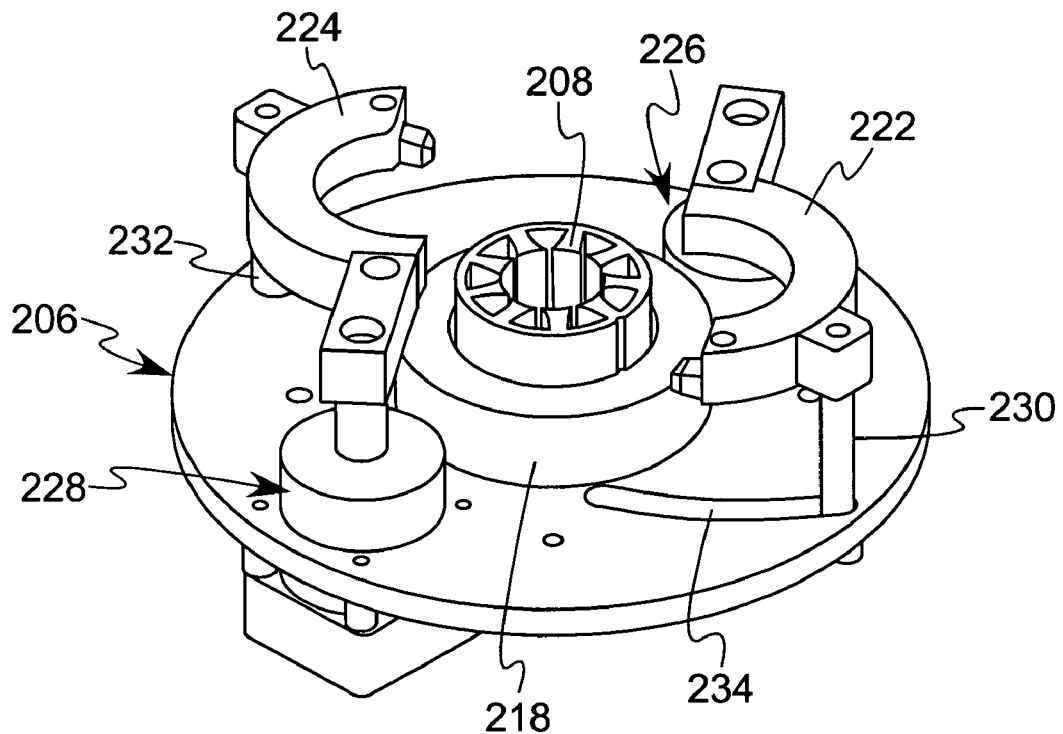
FIGS. 15 and 16 are perspective views of a stator nest for the winding station.
Figure 16:
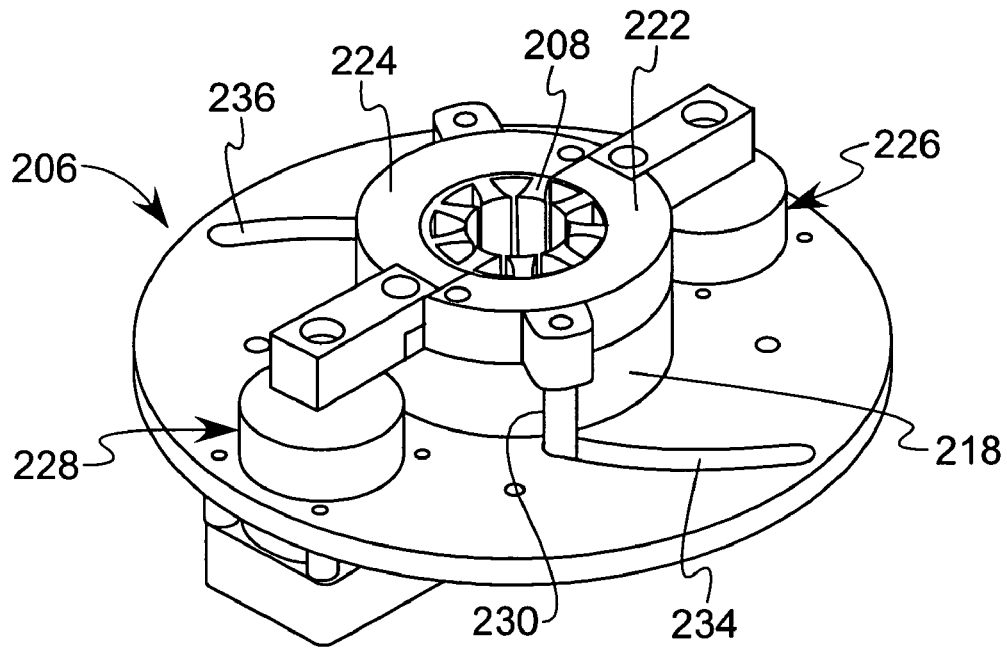

Referring further to FIGS. 15 and 16, the stator nest 206 comprises a base ring 218 for receiving a stator stack 208, where the stator stack 208 may be deposited in the base ring 218 by a stator holder 219 located on a movable extension 221 of a robotic apparatus 220 (FIGS. 2 and 29) such as a Denso VS-6556EM. The base ring 218 includes a lower radially inwardly extending lip for supporting the stator stack 208. A pair of clamp arms 222, 224 are supported for pivotal movement, as actuated by actuator assemblies 226, 228, such as air actuated assemblies to move into close engaging contact with the stator stack 208. In addition, the actuator assemblies 226, 228 actuate the clamp arms 222, 224 to move vertically downwardly as they pivot, such that they each travel in a helical path as they pivot. The actuator assemblies 226, 228 may comprise an SC series swing clamp provided by Numatics Motion Control of Avon, Ohio. Guide posts 230, 232 attached to respective clamp arms 222, 224 move through slots 234, 236 to guide and support the clamp arms 222, 224 in their movement. The clamp arms 222, 224 meet in their closing movement at a location slightly vertically spaced above their final position. In a final step of clamping the stator stack 208, the clamp arms 222, 224 are moved in linear vertical movement to engage an upper radially inwardly extending lip defined by upper edges of the clamp arms 222, 224 to firmly clamp the stator stack 208 between the base ring 218 and the clamp arms 222, 224.

As seen in FIG. 14, the winding station 16 further includes three twisting assemblies 238, 240, 242 aligned at predetermined locations relative to the stator nest 206 and the stator stack 208 held therein, as well as relative to the position of the winding tool 172 at the beginning and end of a winding operation. As is described in greater detail below, each of the twisting assemblies 238, 240, 242 are positioned at locations aligned with the wire exit apertures 192, 194, 196 of the winding tool 172 in order to grip and rotate or twist the respective pairs of wires 18, extending from the winding tool 172 at the beginning of a winding operation and extending from a completed coil on the stator stack 208 at the end of a winding operation.

Figure 17:
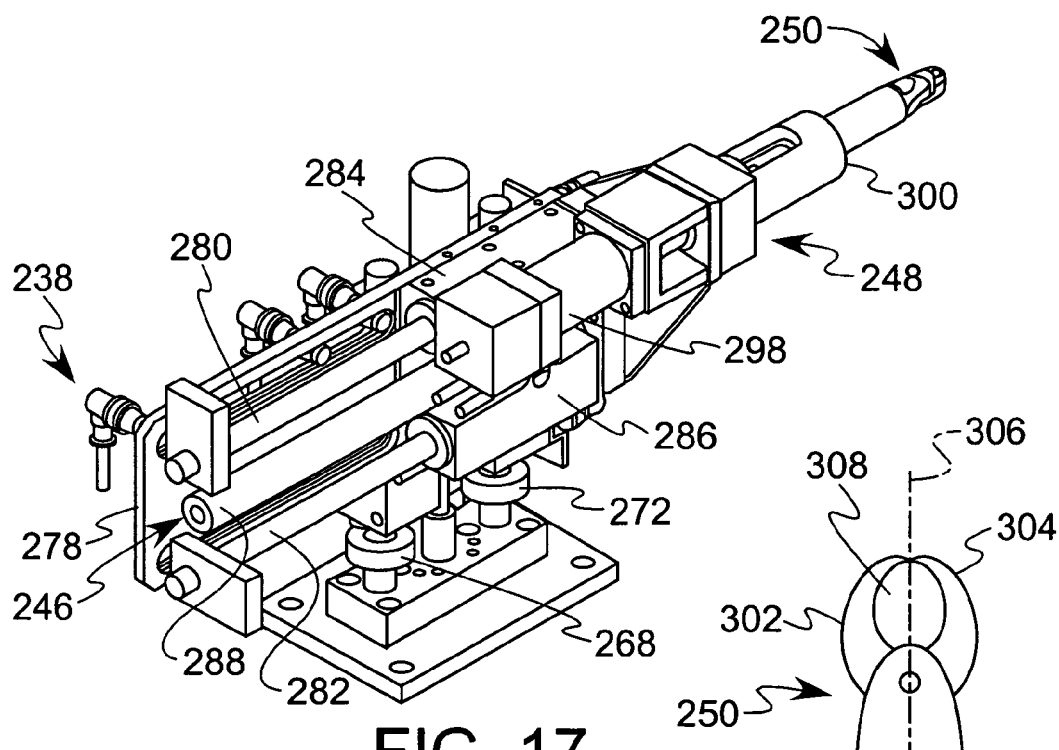
FIGS. 17 and 18 are perspective views of a twisting assembly for the winding station.
Figure 19:
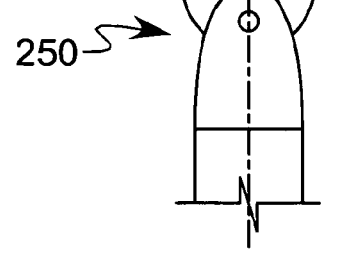
FIG. 19 is a plan view of gripper portion of the twisting assembly.
Figure 18:
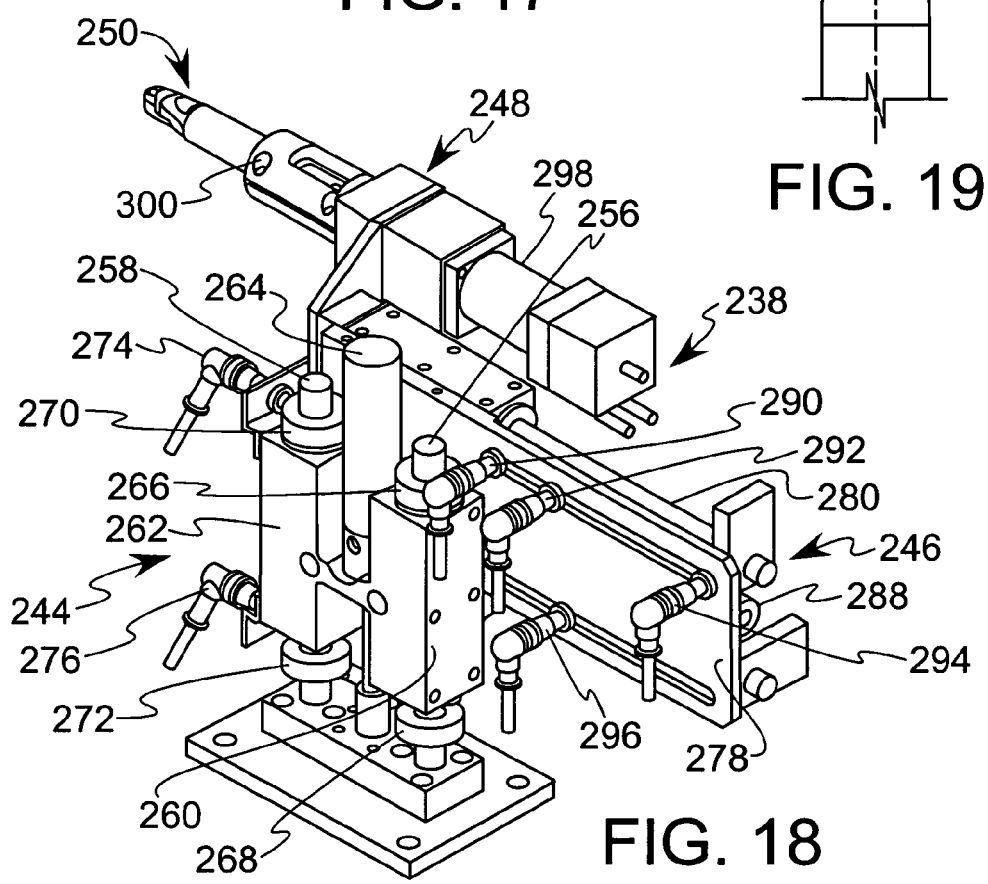

Referring to FIGS. 17, 18 and 19, the structure of the twisting assemblies will be described with particular reference to one of the twisting assemblies 238, the other twisting assemblies 240, 242 being identical. The twisting assembly 238 includes a vertical actuator subassembly 244, a horizontal actuator subassembly 246 and a gripper subassembly 248. The horizontal actuator subassembly 246 is supported by the vertical actuator subassembly 244 for movement in a vertical direction between predetermined upper and lower positions. The gripper subassembly 248 is supported by the horizontal actuator subassembly 246 for movement in the horizontal direction, and the gripper subassembly 248 includes a gripper portion 250 which is actuated for rotational movement.

The vertical actuator subassembly 244 includes a pair of support posts 256, 258 and a pair of bearing blocks 260, 262 supported on the support posts 256, 258 for sliding movement. The bearing blocks 260, 262 are actuated in vertical movement by an air cylinder actuator 264. The travel of the bearing blocks 260, 262 is limited by respective pairs of upper and lower stops 266, 268 and 270, 272. In addition, the vertical position of the bearing blocks 260, 262 is monitored by upper and lower sensors 274, 276.

The horizontal actuator subassembly 246 includes a support plate 278 supported on the bearing blocks 260, 262 of the vertical actuator subassembly 244. The support plate 278 supports a pair of guide rods 280, 282, and a pair of bearing blocks 284, 286 are supported on the guide rods 280, 282 for sliding movement. An air cylinder 288 is supported on the support plate 278 for providing a biasing force and moving the bearing blocks 284, 286 along the guide rods 280, 282. In addition, the horizontal position of the bearing blocks 284, 286 at a plurality of predetermined locations is monitored by sensors 290, 292, 294, 296.

The gripper subassembly 248 is supported on the bearing blocks 284, 286 of the horizontal actuator subassembly 246 and includes a rotation servo motor 298 and an air driven grip actuator 300. The servo motor 298 and grip actuator 300 operate to cause rotating and gripping movement of the gripper portion 250. As seen in FIG. 19, the gripper portion 250 comprises a pair of grip jaws 302, 304 which are actuated between an open position where the jaws 302, 304 are separated from each other, and a closed position where the ends of the jaws 302, 304 are in gripping engagement adjacent each other. The rotation servo motor 298 operates to rotate the jaws 302, 304 about a rotation axis 306 for the jaws 302, 304 to perform a twisting operation on wire 18, such as pairs of wire 18, gripped by the ends of the jaws 302, 304. In addition, it should be noted that a space 308 is defined between the closed jaws 302, 304 which is used for capturing the pairs of wire 18 in sliding contact in a loop forming operation, as will be described further below.

Referring to FIGS. 20-28, showing the twisting assembly 238 diagrammatically, the operation of the twisting assemblies 238, 240, 242 will be described with reference to the twisting assembly 238, it being understood that similar operations are performed by the twisting assemblies 240, 242 simultaneously with the operation described for the twisting assembly 238.

Figure 20:
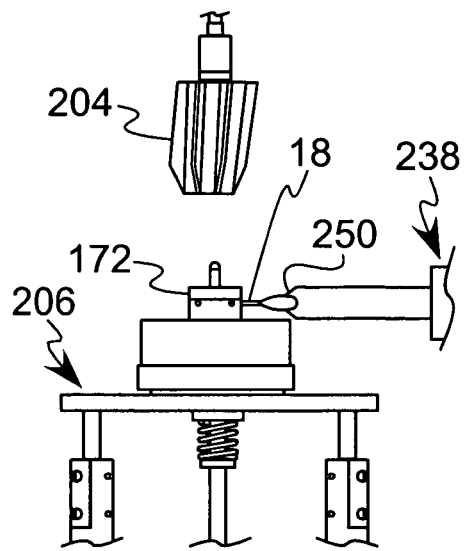
FIGS. 20-28 are diagrammatic elevation views illustrating the operation of one of the twisting assemblies for the winding station.
Figure 21:
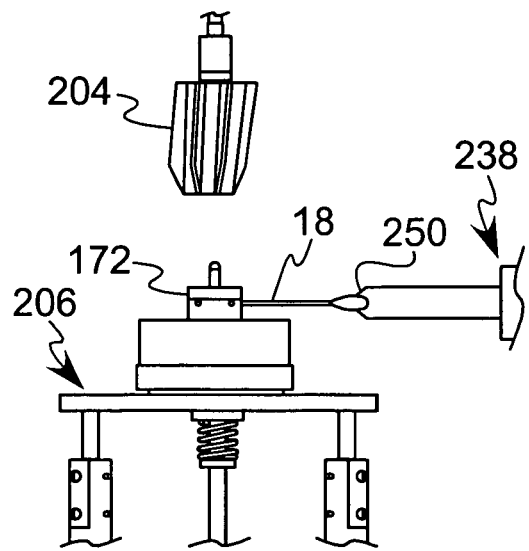

At the initiation of a winding operation, as seen in FIG. 20, a leading end of a pair of the wires 18 are fed by actuation of the feed mechanism 14 to extend from the winding tool 172, and the ends of the wires 18 are gripped by the jaws 302, 304. It should be noted that the section of the wires 18 at the gripped ends have been stripped of insulation at the stripping station 12. After gripping the wires 18 adjacent the winding tool 172, the gripper subassembly 248 moves back under actuation of a low pressure applied to the air cylinder 288 (FIG. 21) and the wire is fed out of the winding tool 172 by actuation of the feed mechanism 14. It should be understood that the pressure applied by the air cylinder 288 is not sufficient to cause the wire 18 to be drawn out of the winding tool 172. The pressure applied by the air cylinder 288 is sufficient to maintain a tension on the wire 18 and the extent to which the wire 18 passes out of the winding tool 172 is controlled through actuation of the feed mechanism 14.

Figure 22:
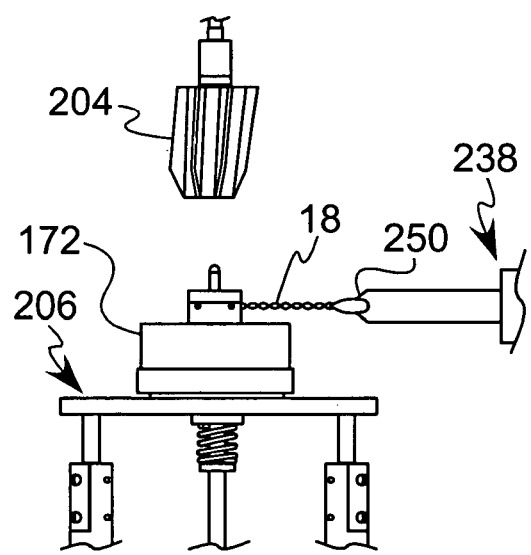

After pulling the wire 18 back, as dictated by the wire feeder 14, the jaws 302, 304 are rotated to twist the wire pair, as illustrated by FIG. 22. In this step, the gripper jaws 302, 304 are substantially at the same level as the wire exit aperture 192. Subsequently, the winding tool 172 performs a coil winding operation in a known manner, as described in the above-referenced patents, to form wire coils comprising two wires for each coil. It should be noted that the low pressure provided by the air cylinder 288 provides a compliant force for holding the wires 18 whereby, at the initiation of the winding operation, the jaws 302, 304 are permitted to move toward the winding tool 172 in response to an initial winding force, which movement prevents the wound wire from being bent sharply and possibly being cut as the winding operation begins. Also, the compliant force avoids slippage of the wire in the jaws 302, 304 which could cause damage to the wire and/or loss of gripping contact between the jaws 302, 304 and the wire 18. Subsequent to the initiation of the winding operation, the jaws 302, 304 may release the ends of the wire 18.

Figure 23:
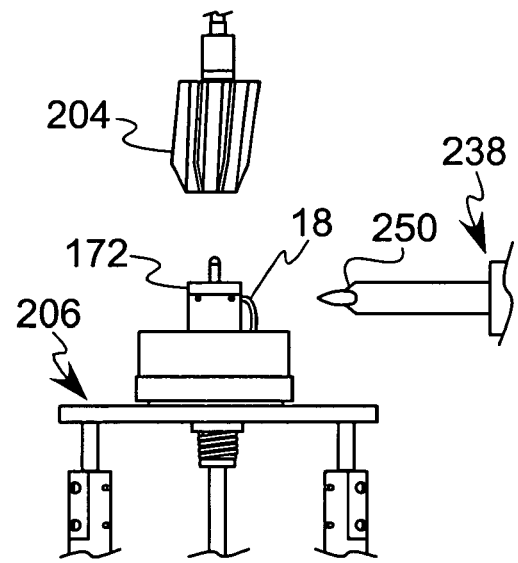

The twisting assemblies 238, 240, 242 are further used to twist the leads at the end of the winding operation, as is further described with reference to a single twisting assembly 238. Referring to FIG. 23, at the end of the coil winding operation, the winding tool 172 is located at an elevated position, where the wire exit aperture 192 is located above the level of the jaws 302, 304. An amount of wire 18 is fed from the winding tool 172 to form a vertically extending loop of wire.

Figure 24:
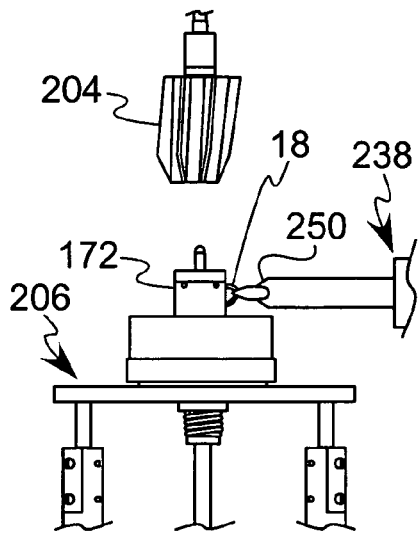
Figure 25:
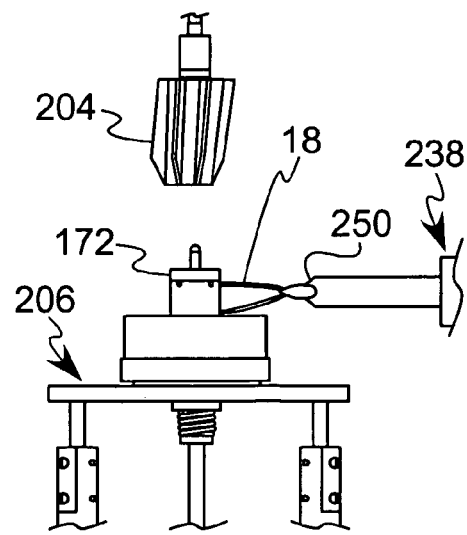

As seen in FIG. 24, the jaws 302, 304 are moved inwardly and closed together such that the ends of the jaws 302, 304 meet in a space between the loop of wire 18 and the winding tool 172. The wire 18 extends through and is trapped within the space 308 between the closed jaws 302, 304. A low pressure is then applied to the air cylinder 288 and the feed mechanism 14 is activated to feed additional wire 18 from the winding tool 172, such that the jaws 302, 304 move away from the winding tool 172, and the loop of wire slides through the space 308 as the loop is expanded by driving the wire feed mechanism 14 in combination with simultaneous the movement of the jaws 302, 304 away from the winding tool 172, as seen in FIG. 25.

Figure 26:
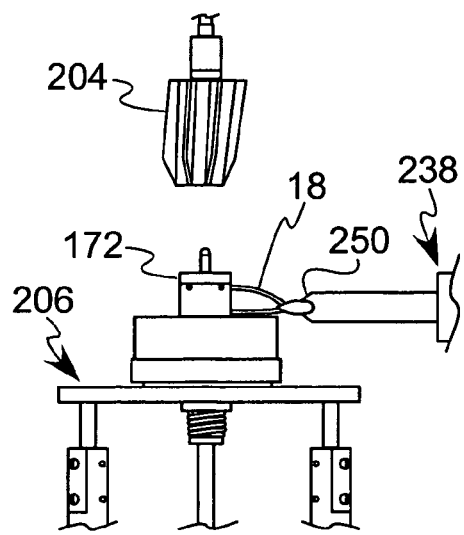

After the jaws 302, 304 have expanded the wire loop, the pressure in the air cylinder 288 is neutralized, and an additional small amount of wire 18 is fed to release tension on the wire loop. The jaws 302, 304 are then moved downwardly to a position which places the jaws 302, 304 substantially level with the top of the stator stack 208 and the top of the clamp arms 222, 224, as seen in FIG. 26. The jaws 302, 304 rotate slightly to align the jaws 302, 304 with both of the wire strands, which are oriented between a vertical and horizontal alignment relative to each other as a result of extending out of the winding tool 172 and around the jaws 302, 304 in a loop. The jaws 302, 304 then grip the wire 18 at the outer edge of the loop.

Figure 27:
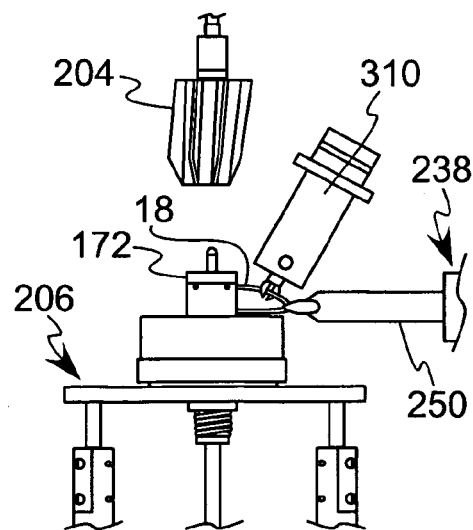
Figure 28:
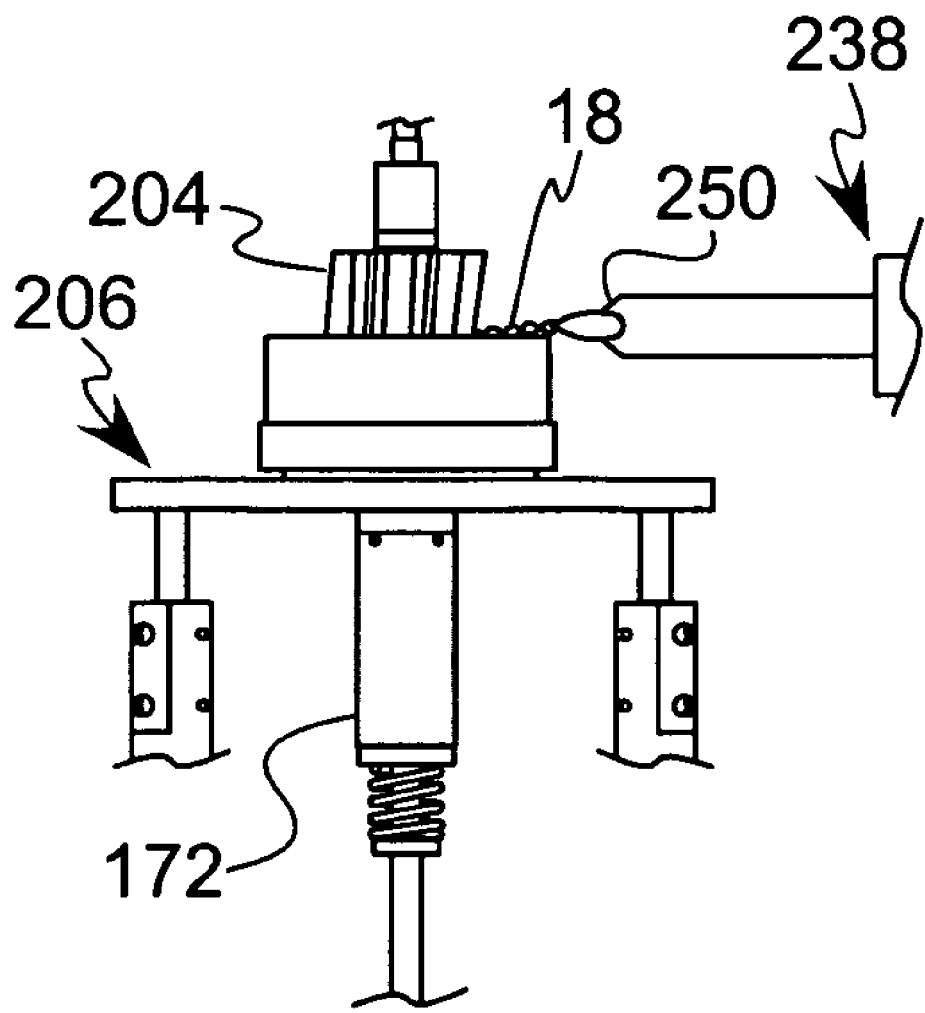

As seen in FIG. 27, with the wires gripped by the jaws 302, 304, a cutter 310 mounted to the robotic apparatus 220 is moved into alignment with an upper portion of the wire loop and cuts the wire 18. The remaining wire extending from the winding tool 172 is drawn back into the winding tool 172 by reversing the drive direction of the feed mechanism 14, the winding tool 172 moves down to position the wire exit apertures 192, 194, 196 below the level of the stator nest 206, and the drifting tool 204 moves down into engagement within the stator stack 208, as illustrated in FIG. 28. In addition, the jaws 302, 304, which continue to grip the wire 18 after the wire cutting operation, are driven in rotation to twist the wires 18 together.

It should be noted that the ends of the wires 18 twisted at the end of the coil winding operation have been stripped at the stripper station 12, and the ends of the leads remaining extending from the winding tool after the wire cutting operation are also stripped and will form the starting leads for the next coil forming operation.

Figure 29:
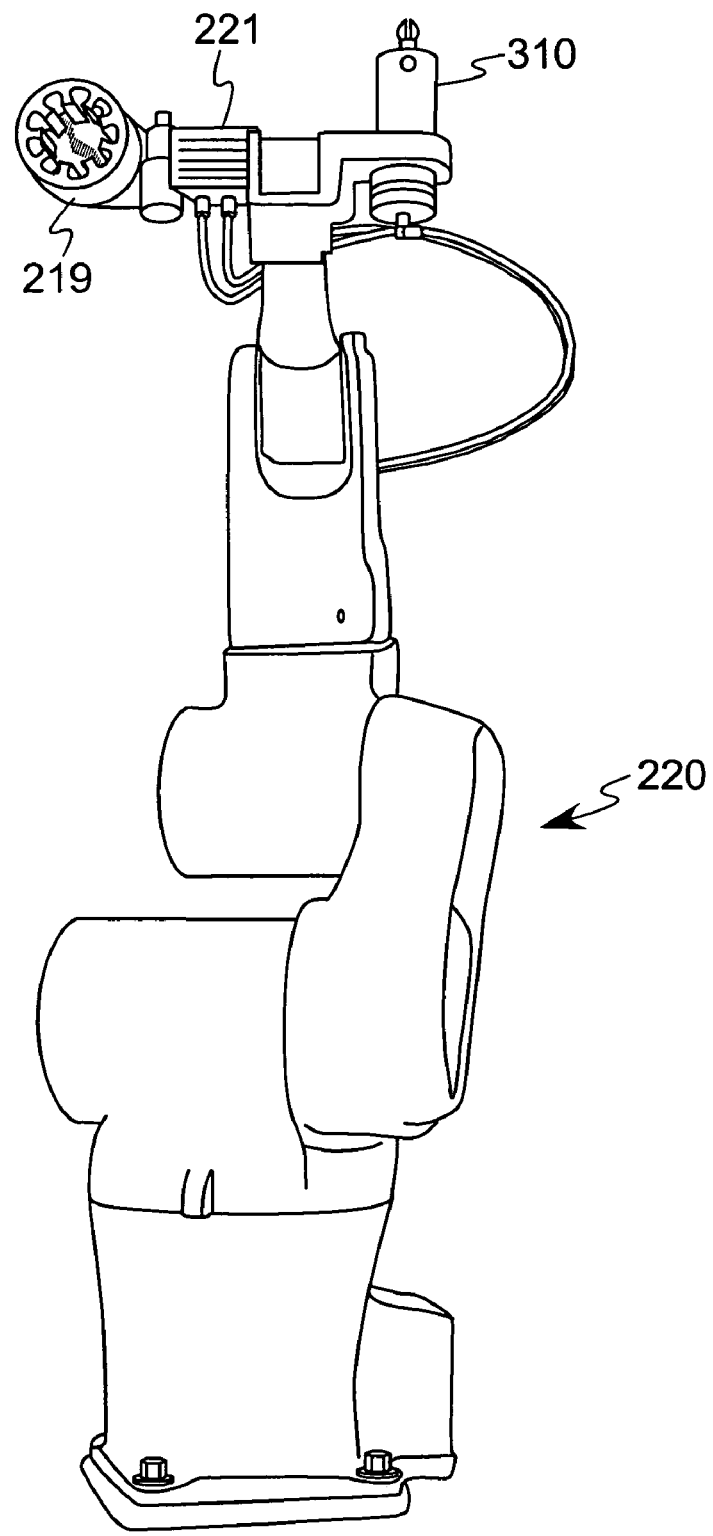
FIG. 29 is a perspective view of a robot for loading stator stacks in the stator nest and for cutting leads on the stators during the winding operation.

In addition, subsequent to the winding tool 172 moving down below the stator nest 206, the feed mechanism 14 feeds wire forward and the stripper station 12 is activated to perform a stripping operation on sections of the wire 18 resulting in wire 18 being pushed out of the winding tool 172. Subsequent to the wire stripping operation, the feed mechanism 14 is reversed to draw the wire back into the winding tool 172 in preparation for moving the winding tool 172 upwardly to perform the next coil winding operation when another stator stack 208 is loaded in the stator nest 206 by the robotic apparatus 220 (FIG. 29).

It should be understood that the wire is stripped in the stripping station 12 at predetermined locations such that the stripped sections of the wire 18 will arrive in the winding tool 172 at the appropriate times to coincide with the beginning or end of a coil winding.

Also, it should be noted that the movable extension 221 of the robotic apparatus 220 (FIG. 29) is capable being manipulated by the robotic apparatus 220 to position the stator holder 219 and the cutter 310 at the appropriate location for either transferring a stator stack 208 to or from the stator nest 206, or for cutting the wires 18.

All documents cited in the Detailed Description of the Invention are incorporated herein by reference; the citation of any document is not to be construed as an admission that it is prior art with respect to the present invention.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A wire stripper for stripping wire as it travels to a winding machine including a feed mechanism for drawing wire through said wire stripper and feeding it to a winding tool for winding the wire on a stator stack for a dynamo-electric machine, said wire stripper comprising an actuation assembly for actuating a movable blade member, said wire stripper further comprising:
    said movable blade member being located within said actuation assembly;
    said stripper includes a saddle member located adjacent said blade member and defining a pocket for receiving a wire;
    said actuation assembly supported for rotational movement about a rotational axis as the wire is conveyed along said rotational axis past said movable blade member and said saddle member;
    said actuation assembly defining opposing first and second ends and an opening at each end for passage of wire along said rotational axis from said first end to said second end;
    said saddle member being stationary, in a radial direction, relative to said rotational axis; and
    said movable blade member being movable in a radial direction, relative to said rotational axis, to engage the wire located in said pocket of said saddle member.

2. The apparatus of claim 1 wherein said blade member is supported for axial movement in a direction generally parallel to said rotational axis.

3. The apparatus of claim 2 wherein said axial movement of said blade member in said direction generally parallel to said rotational axis causes said blade member to move in a direction generally perpendicular to said rotational axis.

4. The apparatus of claim 3 wherein said blade member is connected to an actuator for moving said blade member in said axial direction generally parallel to said rotational axis for selectively stripping an exterior surface of said wire located in said pocket of said saddle member.

5. The apparatus of claim 3 including a stop member located for limiting movement of said blade member in said direction generally parallel to said rotational axis, said stop member being movable relative to the blade member to adjust a stop location for said blade member.

6. In a winding machine for winding wire on a stator stack for a dynamo-electric machine, a wire feed comprising:
    a first plurality of segments connected together to form a first endless segment chain and supported to provide a first elongated run;
    a second plurality of segments connected together to form a second endless segment chain and supported to provide a second elongated run;
    each of said first and second endless segment chains comprising a respective chain and sets of segments mounted to said chains;
    said first and second elongated runs located adjacent to each other to define an elongated nip extending in a wire conveyance direction;
    a wire entry port located adjacent a first end of said nip for feeding wire to said elongated nip; and
    a wire exit port located adjacent a second end of said nip for receiving wire from said elongated nip.

7. The apparatus of claim 6 including a drive for driving at least one of said first and second endless segment chains.

8. The apparatus of claim 6 including a pressure member located behind each of said first and second elongated runs to provide a predetermined compressive engagement force to said runs at said elongated nip.

9. The apparatus of claim 6 wherein the segments of at least one of said runs comprise a resiliently compressible surface for engaging said wire.

10. The apparatus of claim 6 wherein said wire entry and exit ports define elongated openings for passage of a plurality of wires in side-by-side relation therethrough, where said elongated openings are elongated in a direction generally transverse to said first and second elongated runs.

11. The apparatus of claim 6 wherein a plurality of wires are simultaneously conveyed between said first and second elongated runs, and including a wire guide tube for guiding said wire in side-by-side relation from said elongated nip to a winding tool.

12. The apparatus of claim 11 wherein said wire guide tube comprises a pair of elongated, generally flat resilient strips located in spaced relation to define a wire passage therebetween, and a flexible sheath surrounding said flat strips, where said guide tube is resiliently flexible about one axis.

13. The apparatus of claim 6 including a winding tool comprising a cylindrical body for receiving a plurality of wires fed from said wire exit port, said body including structure defining a wire path leading from a wire entry at a bottom portion of said body to exit apertures in a side of said body.

14. The apparatus of claim 13 wherein said wire path extends to a side of said body diametrically opposite from said exit apertures at a location between said wire entry and said exit apertures.

15. The apparatus of claim 13 wherein said exit apertures comprise elongated openings having an axis of elongation extending generally along the direction of a longitudinal axis of said cylindrical body.

16. The apparatus of claim 13 wherein each said wire path of said body guides a pair of wires through said body, each said pair of wires passing through one of said exit apertures for placement in a stator stack.

17. A winding machine for winding wire on a stator stack for a dynamo-electric machine comprising:
- a stator nest for holding a stator stack;
- winding tool extending through said stator nest for locating wire in a stator stack held in said stator nest;
- a wire feeder for driving wire relative to said winding tool;
- a wire gripper located adjacent said stator nest; and
- said wire gripper comprises jaws movable between an open position where said jaws are spaced from each other and a closed position where said jaws a located adjacent to each other to engage a wire extending from said winding tool.

18. The apparatus of claim 17 wherein said jaws are rotatable to twist a pair of wire portions together.

19. The apparatus of claim 17 wherein said winding tool is movable along a winding tool axis, and said wire gripper is movable in a generally transverse direction relative to said winding tool axis.

20. The apparatus of claim 19 wherein said wire gripper is further movable generally parallel to said winding tool axis.

21. The apparatus of claim 19 wherein said wire gripper is resiliently biased in said generally transverse direction by an air actuator.

22. The apparatus of claim 17 wherein said stator nest includes a pair of clamp arms supported for movement about pivot axes into engagement with said stator stack in said stator nest.

23. The apparatus of claim 22 wherein said clamp arms are movable in a direction transverse to said pivot axes to move said clamp arms down into engagement with said stator stack in addition to said pivotal movement of said clamp arms.

24. A method of winding wire onto a stator stack comprising:
- feeding plural first wire ends from an exit aperture in a winding tool located for passage through a stator stack;
- gripping said first wire ends with a wire gripper supported for movement adjacent said stator stack;
- feeding additional wire from said exit aperture in said winding tool and moving said first wire ends away from said winding tool with said wire gripper;
- rotating said wire gripper to twist said first wire ends together; and
- moving said winding tool through said stator stack to wind wire coils on teeth of said stator stack.

25. The method of claim 24 wherein said exit aperture comprises a slot, and said step of feeding wire ends comprises simultaneously feeding a pair of wires from said slot.

26. The method of claim 24 including applying a resilient force to said wire gripper, and further including the step of said wire pulling said wire gripper toward said stator stack against said resilient force at the beginning of said step of moving said winding tool.

27. The method of claim 24 including feeding a loop of wire from said winding tool at the end of said step of moving said winding tool, and including the step of said wire gripper engaging said loop of wire and drawing said loop of wire away from said winding tool.

28. The method of claim 27 including the step of cutting said loop of wire.

29. The method of claim 28 wherein, after said step of cutting said loop of wire, including the step of drawing said wire into said winding tool.

30. The method of claim 29 wherein, after said step of drawing said wire into said winding tool, including the step of moving said exit aperture to a location below said stator stack and feeding a predetermined length of wire while stripping an exterior coating from a predetermined portion of said wire.

31. The method of claim 28 wherein, after said step of cutting said loop of said wire, a drift tool is moved into engagement with wire coils formed in said stator stack, and said wire gripper rotates to twist second wire ends together.

* * * * *

UNITED STATES PATENT AND TRADEMARK OFFICE
CERTIFICATE OF CORRECTION

PATENT NO.         : 7,325,764 B2
APPLICATION NO.  : 11/111033
DATED              : February 5, 2008
INVENTOR(S)        : Burch et al.

Page 1 of 1

It is certified that error appears in the above-identified patent and that said Letters Patent is hereby corrected as shown below:

Col. No. 5, line 26, "In should be understood" should read --It should be understood--.

Col. No. 13, line 13, "where said jaws a located" should read --where said jaws are located--.

Col. No. 14 Claim 32 was omitted:

32. The apparatus of claim 2 including a blade holder supporting said blade member and wherein said actuation assembly further includes an actuation shaft connected to said blade holder and movable in said direction generally parallel to said rotational axis, said wire passing through said actuation shaft.

Signed and Sealed this

Ninth Day of September, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,325,764 B2 | Page 1 of 1 |
| APPLICATION NO. | : 11/111033 | |
| DATED | : February 5, 2008 | |
| INVENTOR(S) | : Burch et al. | |

It is certified that error appears in the above-identified patent and that said Letters Patent is hereby corrected as shown below:

Col. No. 5, line 26, "In should be understood" should read --It should be understood--.

Col. No. 13, line 13, "where said jaws a located" should read --where said jaws are located--.

Col. No. 14, line 39 insert:

--32. The apparatus of claim 2 including a blade holder supporting said blade member and wherein said actuation assembly further includes an actuation shaft connected to said blade holder and movable in said direction generally parallel to said rotational axis, said wire passing through said actuation shaft.--

This certificate supersedes the Certificate of Correction issued September 9, 2008.

Signed and Sealed this

Thirtieth Day of September, 2008

JON W. DUDAS
*Director of the United States Patent and Trademark Office*